United States Patent
Wang et al.

(10) Patent No.: US 9,317,926 B2
(45) Date of Patent: Apr. 19, 2016

(54) AUTOMATIC SPINAL CANAL SEGMENTATION USING CASCADED RANDOM WALKS

(71) Applicant: Siemens Aktiengesellschaft, Munich (DE)

(72) Inventors: Qian Wang, Chapel Hill, NC (US); Le Lu, Chalfont, PA (US); Dijia Wu, North Brunswick, NJ (US); Shaohua Kevin Zhou, Plainsboro, NJ (US)

(73) Assignee: Siemens Aktiengesellschaft, München (DE)

( * ) Notice: Subject to any disclaimer, the term of this patent is extended or adjusted under 35 U.S.C. 154(b) by 176 days.

(21) Appl. No.: 14/193,056

(22) Filed: Feb. 28, 2014

(65) Prior Publication Data
US 2014/0254907 A1    Sep. 11, 2014

Related U.S. Application Data

(60) Provisional application No. 61/773,217, filed on Mar. 6, 2013.

(51) Int. Cl.
*G06T 7/00* (2006.01)

(52) U.S. Cl.
CPC ............ *G06T 7/0081* (2013.01); *G06T 7/0087* (2013.01); *G06T 2200/04* (2013.01); *G06T 2207/10081* (2013.01); *G06T 2207/20081* (2013.01); *G06T 2207/20156* (2013.01); *G06T 2207/30012* (2013.01)

(58) Field of Classification Search
None
See application file for complete search history.

(56) References Cited

U.S. PATENT DOCUMENTS

| | | | |
|---|---|---|---|
| 6,396,939 B1 | 5/2002 | Hu et al. | |
| 7,804,986 B2 | 9/2010 | Lai et al. | |
| 7,903,851 B2 | 3/2011 | Reisman et al. | |
| 8,175,349 B2 | 5/2012 | Jerebko et al. | |
| 8,571,282 B2 | 10/2013 | Davydov | |
| 2007/0173744 A1 | 7/2007 | Lai et al. | |
| 2008/0044074 A1 | 2/2008 | Jerebko et al. | |
| 2009/0226055 A1 | 9/2009 | Dankowicz et al. | |
| 2012/0183193 A1* | 7/2012 | Wels | G06K 9/4614 382/131 |

OTHER PUBLICATIONS

Sowmya Ramakrishnan, Christopher Alvino, Leo Grady, and Atilla Kiraly, "Automatic Three-Dimensional Rib Centerline Extraction from CT Scans for Enhanced Visualization and Anatomical Context", 2011, Proceedings of SPIE, vol. 7962.*

(Continued)

*Primary Examiner* — Siamak Harandi (57) ABSTRACT

A method and apparatus for automatic spinal canal segmentation in medical image data, such as computed tomography (CT) image data, is disclosed. An initial set of spinal canal voxels is detected in the 3D medical image using a trained classifier. A spinal canal topology defined by a current set of spinal canal voxels is refined based on an estimated medial line of the spinal canal. Seed points are sampled based on the refined spinal canal topology. An updated set of spinal canal voxels is detected in the 3D medical image using random walks segmentation based on the sampled seed points. The spinal canal topology refinement, seed points sampling, and random walks segmentation are repeated in order to provide cascaded random walks segmentation to generate a final spinal canal segmentation result.

27 Claims, 7 Drawing Sheets

(56) References Cited

OTHER PUBLICATIONS

Tobias Klinder, Jorn Ostermann, Mattias Ehm, Astrid Franz, Reinhard Kneser, and Christian Lorenz, "Automated Model-based Vertebrae Detection, Identification, and Segmentation in CT Images", 2009, Medical Image Analysis, pp. 471-482.*

Leo Grady "Random Walks for Image Segmentation", Nov. 2006, IEEE Trans. on Pattern Analysis and Machine Intelligence, vol. 28, No. 11, pp. 1768-1783.*

* cited by examiner

AUTOMATIC SPINAL CANAL SEGMENTATION USING CASCADED RANDOM WALKS

This application claims the benefit of U.S. Provisional Application No. 61/773,217, filed Mar. 6, 2013, the disclosure of which is herein incorporated by reference.

BACKGROUND OF THE INVENTION

The present invention relates to automatic spinal canal segmentation in medical image data, and more particularly, to automatic spinal canal segmentation in computed tomography images using cascaded random walks.

Segmentation of the spinal canal in medical image data is an important task because it facilitates analysis, diagnosis, and therapy planning related to spines. Segmentation of the spinal canal provides helpful references to parcellate other anatomical structures and contributes to the understanding of full-body medical image scans. Given the spinal canal, it is much easier to delineate the spinal cord, which is vulnerable to dosage tolerance and crucial for radiotherapy.

Conventional techniques for segmentation of the spinal cord or spinal canal typically focus on magnetic resonance (MR) images, at least in part due to the better capability of MR images in rendering soft tissues, as compared to other medical imaging modalities. However, such techniques cannot accurately segment the spinal canal in low-resolution, low-contrast computed tomography (CT) images.

BRIEF SUMMARY OF THE INVENTION

The present invention provides a method and system for automatic segmentation of spinal canals in medical image data. Embodiments of the present invention provide fully automatic segmentation method that can accurately segment spinal canals in low-resolution, low-contrast computer tomography (CT) images.

In one embodiment of the present invention, an initial set of spinal canal voxels is detected in the 3D medical image using a trained classifier. A spinal canal topology defined by a current set of spinal canal voxels is refined based on an estimated medial line of the spinal canal. Seed points are sampled based on the refined spinal canal topology. An updated set of spinal canal voxels is detected in the 3D medical image using random walks segmentation based on the sampled seed points. The refining the spinal canal topology, sampling seed points, and detecting an updated set of spinal canal voxels can be repeated until the spinal canal topology, a length of the estimated medial line of the spinal canal, or the updated set of spinal canal voxels converges.

These and other advantages of the invention will be apparent to those of ordinary skill in the art by reference to the following detailed description and the accompanying drawings.

DETAILED DESCRIPTION

The present invention relates to a method and system for automatic segmentation of spinal canals in medical image data, such as computed tomography (CT) images. Embodiments of the present invention are described herein to give a visual understanding of the spinal canal segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
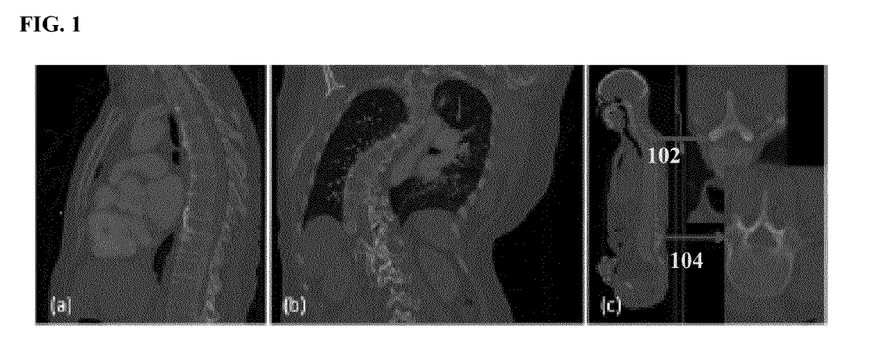
FIG. 1 illustrates exemplary CT images to which embodiments of the present invention can be applied.

Embodiments of the present invention provide an automatic method for segmenting spinal canals in low-resolution, low-contrast CT images. The present inventors have applied this method to highly diverse datasets, such as those acquired from the CT channel in PET-CT on pathological subjects. These CT datasets vary significantly in Field-of-View (FOV), resolution, signal to noise ratio (SNR), pathology, etc. FIG. 1 illustrates exemplary CT images to which embodiments of the present invention can be applied. Image (a) of FIG. 1 is a sagittal view of a restricted FOV near the lung area only. Image (b) is a coronal view of a disease-affected spine. Image (c) is a sagittal view of a full-body scan. As shown in FIG. 1, images (a) and (c) show sagittal views of two typical CT datasets with different FOVs. As shown in image (b), the spine of the disease affected patient twists due to the disease. Image (c) also shows two transverse planes 102 and 104 of the full body scan, which show that the spinal canal is not always contoured by bones. Such variations make it difficult for conventional techniques to accurately segment the spinal canal in low-resolution, low-contrast CT scans.

Random walks (RW) segmentation is a type of interactive segmentation that can be used to segment the spinal canal in medical image data. RW asks users to specify seeding voxels of different labels and then assigns labels to non-seeding voxels by embedding the image into a graph and utilizing intensity similarity between voxels. Users can edit the placement of seeds in order to acquire more satisfactory results. Embodiments of the present invention adapt the idea of interactive segmentation to form a fully automatic approach that segments spinal canals from CT images. Different from manually editing seeds in the interactive mode, embodiments of the present invention refine the topology of the spinal canal and improve the segmentation in an automatic and iterative manner. To start this automatic pipeline, voxels that are inside the spinal canal are initially identified according to their appearance features. For convenience, voxels inside the spinal canal are denoted herein as "foreground" and voxels not inside the spinal canal are denoted as "background". Based on the tentative segmentation, the topology of the spinal canal is extracted and refined by considering both geometry and appearance constraints. Seeds are adjusted accordingly and RW segmentation is performed using the automatically determined seeds. By iteratively applying this scheme, several RW solvers are cascaded in order to build a highly reliable method for segmenting spinal canals in CT images, even under challenging conditions.

As described herein, segmentation of the spinal canal in a medical image is treated as a binary segmentation problem. Let $p_x$ denote the probability of the voxel x of being foreground (inside the spinal canal) after voxel classification and $\bar{p}_x$ the probability of the voxel x being background. In general, $p_x + \bar{p}_x = 1$ after normalization. The binary segmentation can be acquired by applying a threshold to $p_x$. Although shapes of spinal canals can vary significantly across the population, they are tubular structures in general. Embodiments of the present invention start from a small set of foreground voxels with very high classification confidence. These voxels can act as positive seeds in RW to generate a conservative segmentation with relatively low sensitivity but also low false positives. All foreground voxels are assumed to form a continuous and smooth anatomic topology, which refines the seed points in order to better approximate the structure of the spinal canal. Hence, the sensitivity of the RW segmentation increases with the new seeds. By iteratively feeding improved seeds to the RW segmentation, an automatic pipeline is formed that yields accurate segmentation of spinal canals.

Figure 2:
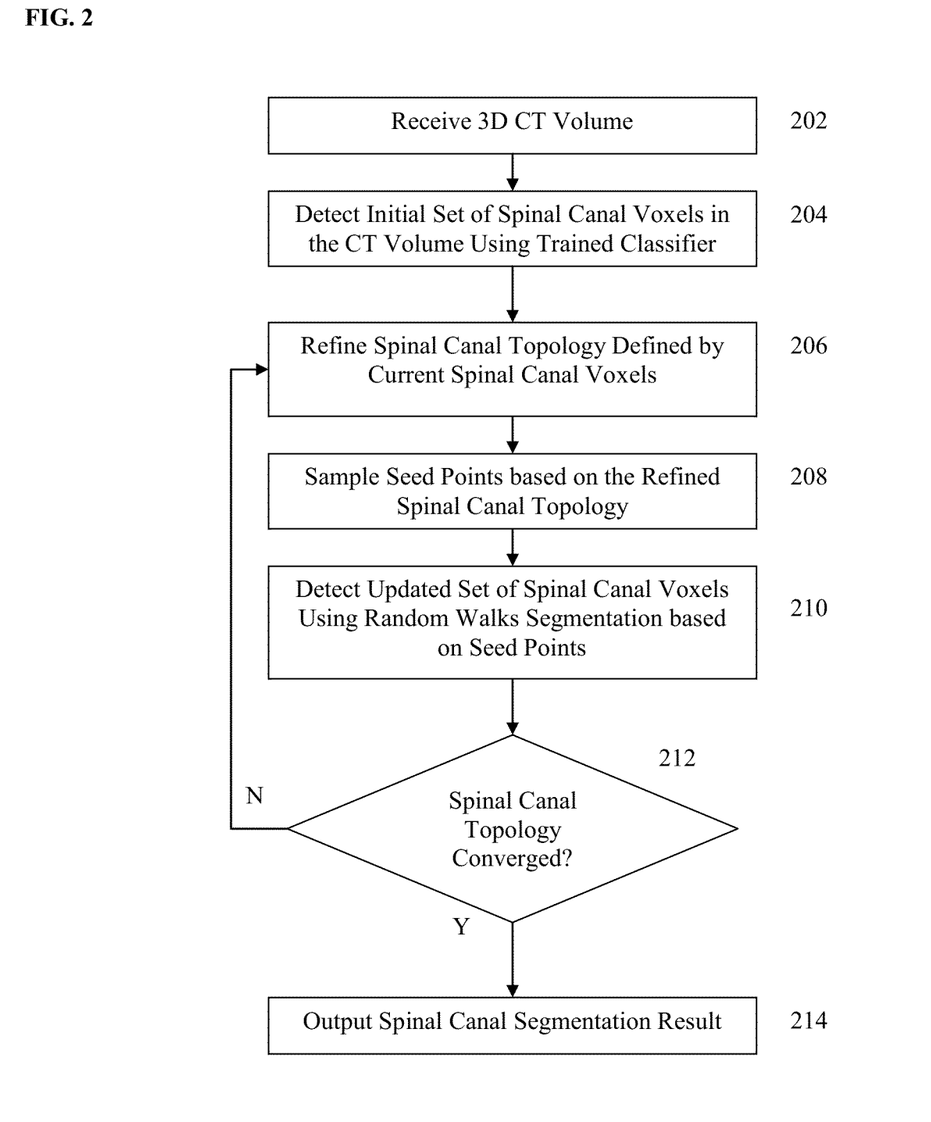
FIG. 2 illustrates a method for segmenting a spinal canal in a 3D CT volume using cascaded random walks (RW) segmentation according to an embodiment of the present invention.

FIG. 2 illustrates a method for segmenting a spinal canal in a 3D CT volume using cascaded random walks (RW) segmentation according to an embodiment of the present invention. The method of FIG. 2 transforms image data representing a patient's anatomy to generate a segmentation of the patient's spinal canal. Although, the method of FIG. 2 segments the spinal canal in a 3D CT volume, the present invention is not limited thereto and the method may be similarly applied to other medical imaging modalities as well.

Referring to FIG. 2, at step 202, a 3D CT volume is received. The 3D CT volume may be a low-resolution, low-contrast CT volume. The CT volume may be received directly from an image acquisition device, such as a CT scanner, or may be received by loading a previously acquired CT volume from a memory or storage of a computer system.

At step 204, an initial set of spinal canal voxels is detected in the CT volume using a trained classifier. The initial set of spinal canal voxels are voxels having a high probability of being within the spinal canal based on their appearance features. In order to identify highly reliable foreground voxels, voxelwise classification is performed by a classifier trained using supervised machine learning. In particular, one or more classifiers are trained to detect spinal canal voxels based on annotated training data.

In a training stage that occurs offline, medial lines of spinal canals are annotated in a number of training CT datasets. Voxels exactly along the medial lines are samples as foreground and background candidates are obtained from a constant distance away from the medial lines. In an advantageous implementation, 3D Haar features are used as voxel descriptors. With varying sizes of detection windows, an abundant collection of Haar features is efficiently computed for each voxel. In an advantageous embodiment, one or more probabilistic boosting tree (PBT) classifiers are then trained with Adaboost nodes. In an exemplary implementation, multiple PBT classifiers that work in coarse-to-fine resolutions are cascaded. This not only speeds up the detection n the early stage by reducing the number of samples, but also exploits features benefiting from higher scales of Haar wavelets in coarse resolutions.

The trained classifiers are applied to the received CT volume to determine, for each voxel in the CT volume, the probability of being a foreground voxel. This results in a probability map of the CT volume. In order to select only highly reliable voxels for the initial set of spinal canal voxels, a high confidence threshold (e.g., >0.9) is applied to probability map generated by the trained classifiers to empirically suppress most false positive errors. This results in a binary segmentation, in which only voxels having a probability higher than the threshold are detected in the initial set of spinal canal voxels. The detection sensitivity will be improved in the following method steps of FIG. 2.

Figure 3:
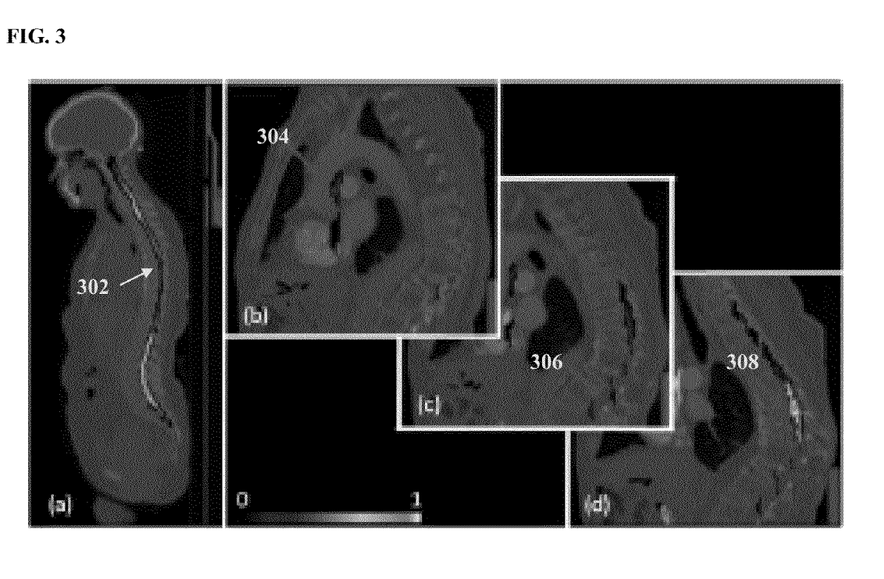
FIG. 3 illustrates exemplary results of voxelwise classification using a trained classifier.

FIG. 3 illustrates exemplary results of voxelwise classification using a trained classifier. Image (a) of FIG. 3 shows a voxel confidence map (probability map) 302 generated by applying voxelwise classification to a training CT image used to train the classifier. Images (b)-(d) of FIG. 3 show voxelwise confidence maps generated by applying the voxelwise classification to a new testing CT volume. As shown in images (b)-(c), when applied to a new testing CT volume, the trained classifier may suffer both false negative and false positive errors. For example, image (b) shows a false positive artifact 304 and image (c) shows a discontinuity 306 of foreground confidence due to false negative errors. Image (d) shows high confidence voxels that have a foreground probability greater than a high confidence threshold (e.g., >0.9) and therefore will be included in the initial set of spinal canal voxels.

Returning to FIG. 2, at step 206, the spinal canal topology defined by the current set of spinal canal voxels is refined. The current set of spinal canal voxels, whether the initial set of spinal canal voxels detected by the trained classifier or an updated set of spinal canal voxels resulting from an RW segmentation, is a tentative spinal canal segmentation. Topology constraints of the spinal canal are used to refine the tentative segmentation in order to acquire a complete spinal canal segmentation. In particular, the medial line of the spinal canal is used to represent its topology. After calculating all segments of medial line of the spinal canal to represent its current topology based on the current set of spinal canal voxels, the segments of the medial line are interleaved into a single connected curve.

Figure 4:
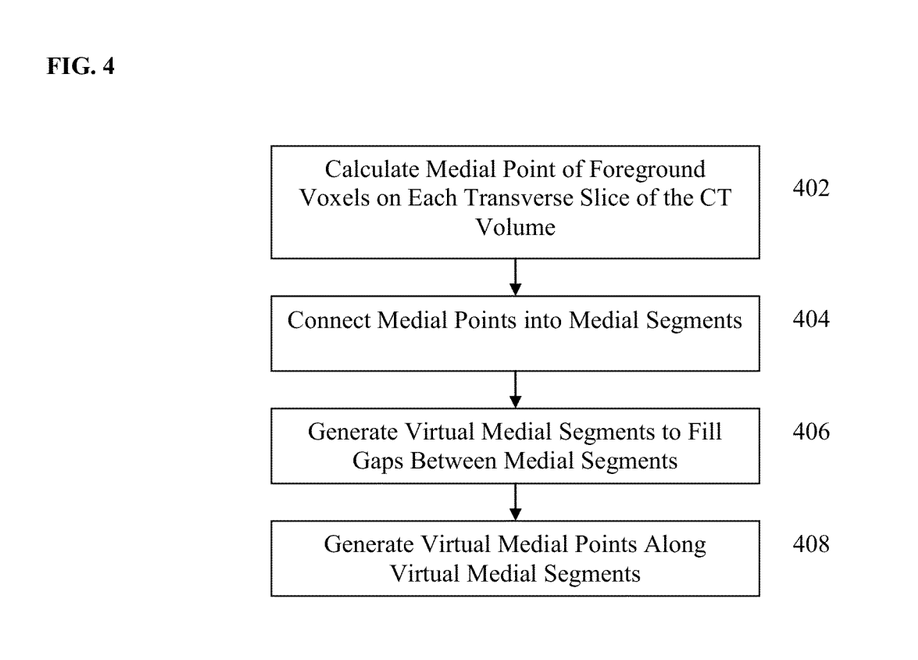
FIG. 4 illustrates a method for refining the spinal canal topology defined by the current set of spinal canal voxels according to an embodiment of the present invention.
Figure 5:
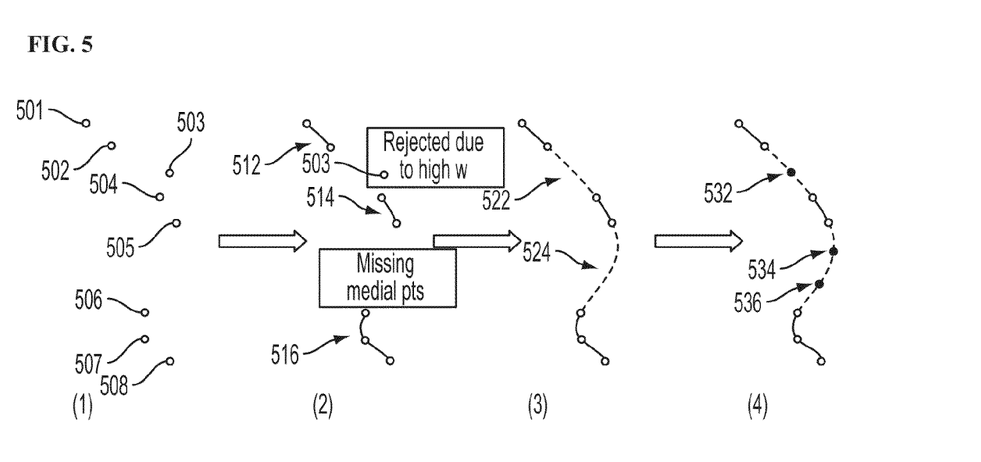
FIG. 5 illustrates exemplary results of the method steps of FIG. 4.

FIG. 4 illustrates a method for refining the spinal canal topology defined by the current set of spinal canal voxels according to an embodiment of the present invention. The method of FIG. 4 can be used to implement step 206 of FIG. 2. At step 402, based on the current set of spinal canal voxels (foreground voxels), the medial point of foreground voxels on each transverse slice of the CT volume is calculated. For each transverse slice, the medial point is calculated as the point having the least sum of distances to all other foreground voxels on that slice. FIG. 5 illustrates exemplary results of the method steps of FIG. 4. Image (1) of FIG. 5 shows medial points 501-508 estimated in transverse slices of a CT volume.

Returning to FIG. 4, at step 404, the medial points are connected into medial segments. Assuming that medial line of the spinal canal connects all medial points, medial points in adjacent slices can be connected into medial segments. The medial line may break into multiple medial segments since medial points can be missing. Also, a given medial point may be rejected as an outlier if it incurs to high a curvature with the medial line. In particular, the curvature of medial line connecting a medial point to the rest of a medial segment is greater than a threshold, the medial point can be rejected. Image (2) of FIG. 5 shows medial segments 512, 514, and 516 generated by connecting the medial points of image (1). As shown in image (2) of FIG. 5, there are missing medial points between medial segments 514 and 516, and medial point 503 is rejected as an outlier due to high curvature.

Returning to FIG. 4, at step 406, virtual medial segments are generated to fill gaps between the medial segments. In particular, the medial segments are interleaved by filling gaps between the medial segments with smooth virtual segments. Each virtual medial segment c(s) minimizes $\int \|\nabla^2 c(s)\|^2 ds$ to keep smooth as $s \in [0,1]$ for normalized arc-length. The stationary solution to this minimization problem holds when $\nabla^4 c(s)=0$, and the Cauchy boundary conditions are defined by both ends of the virtual segment as well as the tangent direction at both ends. Though the numerical solution is non-unique, the cubic Bezier curve can be applied for fast estimation of the virtual segment. For a certain virtual segment, the ends of the virtual segment are denoted as $P_0$ and $P_3$. An additional control point $P_1$ is placed so that the direction from $P_0$ to $P_1$ is identical to the tangent direction at $P_0$. Similarly, an additional control point $P_2$ is defined according to $P_3$ and the associated tangent direction. It is further required that the four control points are equally spaced. The virtual medial segment is estimated as:

$$c(s)=(1-s)^3 P_0 + 3(1-s)^2 s P_1 + 3(1-s)s^2 P_2 + s^3 P_3. $$

Image (3) of FIG. 5 shows virtual segments 522 and 524 generated between the medial segments of image (2).

Returning to FIG. 4, at step 408, virtual medial points are generated along the virtual medial segments. In addition to the subject specific geometric constraints to keep the virtual segments smooth, an appearance criterion is further incorporated to place virtual medial points along the virtual medial segments. The intensity mean and standard deviation of all existing medial points is calculated. The univariate Gaussian intensity model defined by the intensity mean and standard deviation of the medial points is then used to determine whether a new voxel is likely to be foreground given its simple appearance (intensity) value. In an advantageous implementation, starting from both ends of each virtual medial segment, voxels along the virtual medial are evaluated sequentially and a voxel is admitted as a virtual medial point if its intensity is within a single standard deviation range of the Gaussian intensity model. The sequential process to admit virtual medial points aborts when a disqualified candidate has been encountered. Image (4) of FIG. 5 shows virtual medial points 532, 534, and 536 generated along the virtual medial segments of image (4).

Returning to FIG. 2, at step 208, seed points are automatically sampled based on the refined spinal canal topology. After the spinal canal topology has been refined, the spinal canal topology can provide better seeds for use in RW segmentation. All points along the refined medial line including the newly admitted virtual medial points are used as foreground seeds. Moreover, additional voxels are qualified as foreground seeds if (1) they have been classified as foreground in a previous segmentation; (2) their intensities are within the single standard deviation range of the Gaussian appearance model defined by the intensity mean and standard deviation of the medial points, described above; and (3) they are connected to the medial line via other foreground seeds. In this way, the previously segmented spinal canal voxels are inherited in areas of high confidence, and computation time is decreased since subsequent RW segmentation can treat them as boundary conditions. Surrounding voxels with high intensities (i.e. above a threshold value) in the 3D CT volume are regarded as bones and used as background seeds.

At step 210, an updated set of spinal canal voxels is detected using random walks (RW) segmentation based on the automatically sampled seed points. Similar to PBT-based classification, RW segmentation also produces voxelwise probabilities of being foreground/background, resulting in a probability map of the 3D CT volume. After the foreground and background seeds are determined, RW segmentation determines for each non-seeding voxel x the probability that a random walk departing from that voxel reaches the foreground seeds as $p_x$ and the probability that a random walk from that voxel reaches the background seeds as $\bar{p}_x$. Typically, the non-seeding voxel is assigned to the foreground if $p_x > \bar{p}_x$ or $p_x > 0.5$. In the context of RW, the image is embedded into a graph where the vertices correspond to individual voxels and edges link neighboring voxels. The weight $w_{xy}$ f the edge $e_{xy}$, which measures the similarity between two neighboring voxels x and y, is defined as:

$$w_{xy} = \exp(-\beta(I_x - I_y)^2), \quad (1)$$

where $I_x$ and $I_y$, represent the intensities at voxels x and y, respectively, and $\beta$ s a positive constant. Assuming segmentation boundaries coincident with intensity changes, RW segmentation aims to estimate $p_x$ that minimizes the following energy function:

$$E = \Sigma_{\forall e_{xy}} w_{xy} (p_x - p_y)^2. \quad (2)$$

To optimize the above energy minimization problem is equivalent to solving a Dirichlet problem with boundary conditions defined by the seeds. In particular, $p_x$ is set to 1 if voxel x is a foreground seed and 0 if voxel x is a background seed. The calculated $p_x$ for each non-seeding voxel incorporates spatial information of neighboring voxels, which differs from the independent voxelwise classification using the trained classifier.

Figure 6:
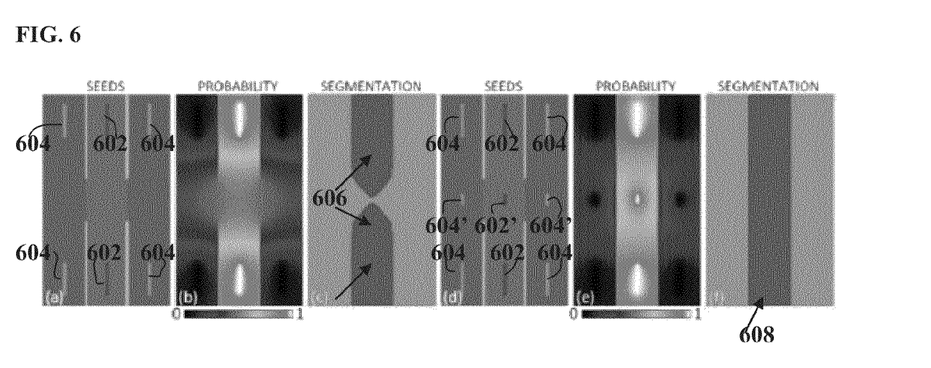
FIG. 6 illustrates an example of RW segmentation with varying numbers of seeds.

The probability of each voxel in RW is associated with the paths from the voxel to the seeds. Accordingly, $p_x$ is dependent not only on the weights of the edges forming each path, but also on the length of each path. This can potentially undermine RW segmentation that is sensitive to the seed locations. FIG. 6 illustrates an example of RW segmentation with varying numbers of seeds. Image (a) of FIG. 6 shows an image with three vertical stripes. The intensity in the middle stripe is slightly different from the outside stripes and approximates the spinal canal surrounded by other tissues in CT data. Certain sections of the stripe boundaries are highlighted to simulate the existence of vertebra, whose presence can be discontinuous. Foreground seeds 602 and background seeds 604 are selected in image (a). Image (b) of FIG. 6 shows a probability map generated using RW segmentation based on the seeds 602 and 604 selected in image (a). Image (c) of FIG. 6 shows the binary segmentation ($p_x > 0.5$) generated from the probability map in image (b). As shown in image (c), the segmented foreground 606 has undesirably fallen into two segments. Although increasing the threshold on $p_x$ and refining $\beta$ to modify the edge weights may improve the segmentation results somewhat, this becomes very ad-hoc. However, more seed points added in proximity to the desired segmentation boundaries provides an improved segmentation result. Image (d) of FIG. 6 shows additional foreground and background seeds 602' and 604', respectively, added to the original foreground and background seeds 602 and 604. Image (e) of FIG. 6 shows a probability map generated using RW segmentation based on the foreground seeds 602 and 602' and the background seeds 604 and 604' selected in image (d). Image (f) of FIG. 6 shows the binary segmentation ($p_x > 0.5$) generated from the probability map in image (b). As shown in image (f), the segmented foreground 308 has been improved with the addition of the seeds 602' and 604'. Although conventional RW segmentation requires a user to interactively add more seeds to improve a segmentation result, the method of FIG. 2 cascades RW segmentation and automatically adds seeds with each refinement of the spinal canal topology.

Figure 7:
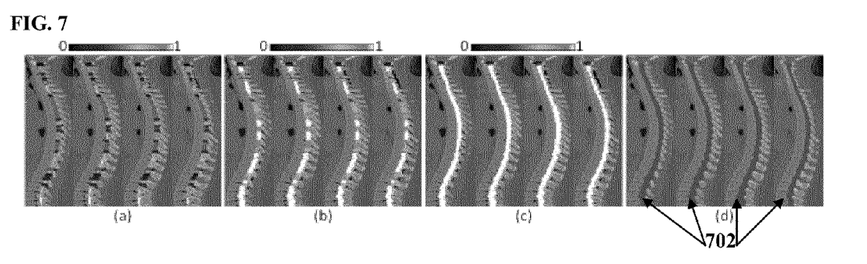
FIG. 7 illustrates exemplary spinal canal segmentation in a CT volume using multiple iterations of RW segmentation.

Returning to FIG. 2, at step 212, it is determined if the spinal canal topology has converged. In particular, it may be determined whether the set of medial points defining the medial line of the spinal canal topology has changed from a previous iteration. Alternatively, it may be determined whether the length of the estimated medial line of the spinal canal has changed from a previous iteration. As an alternative to checking the topology of the spinal canal for convergence, it is also possible to check whether the updated set of spinal canal voxels detected in step 210 has changed from a previously segmented set of spinal canal voxels. If it is determined that the topology of the spinal canal (or the segmentation result) has converged, the method proceeds to step 214. If it is determined that the topology of the spinal canal (or the segmentation result) has not converged, the method returns to step 206, where the topology of the spinal canal is again refined. Seeds are then sampled based on the refined topology (208) which will automatically add new foreground seeds and RW segmentation (210) is performed again based on the new seeds. This results in the cascading of multiple RW solvers in order to generate a final segmentation. During the iterative refinement, the medial line is permitted to grow at both of its ends and thus admit more virtual medial points. The growth of the medial line can be stopped automatically at the tail and be terminated in the head by limiting the maximal radial size of the spinal canal. The cascaded RW segmentation provides increasing sensitive spinal canal segmentation with each iteration. FIG. 7 illustrates exemplary spinal canal segmentation in a CT volume using multiple iterations of RW segmentation. Images (a), (b), and (c) of FIG. 7 illustrate foreground probability maps on four consecutive slices of a CT volume resulting from the first, second, and final (fourth) iteration of RW segmentation, respectively. Image (d) shows the binary segmentation of the spinal canal 702 in the four consecutive slices resulting from the final iteration of RW segmentation.

Returning to FIG. 2, at step 214, the spinal canal segmentation result is output. For example, a binary segmentation showing the segmented spinal canal voxels can be generated and displayed on a display of a computer system. The probability map resulting from the final RW segmentation may also be displayed. Although not shown in FIG. 2, after the topology of the spinal and/or the segmentation result has become stable or converged, remaining medial segments that are isolated from the others (i.e., not connected to the rest of the medial line of the spinal canal) may then be excluded from the foreground prior to outputting the spinal canal segmentation results. Such isolated medial segments typically reflect artifacts, especially from legs.

Figure 8:
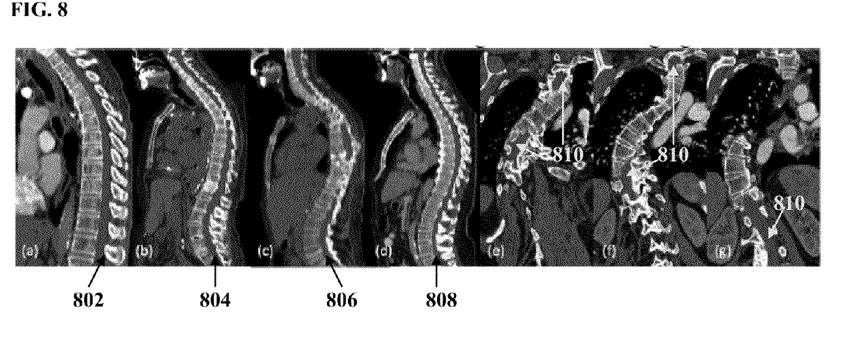
FIG. 8 illustrates exemplary spinal canal segmentation results.

FIG. 8 illustrates exemplary spinal canal segmentation results. Images (a), (b), (c), and (d) of FIG. 8 show sagittal views of spinal canal segmentation results 802, 804, 806, and 808, respectively, segmented in respective CT volumes. Image (e) shows (e)-(g) of FIG. 8 are coronal views of a CT volume showing a spinal canal segmentation result 810 in an extreme case, in which the spine twists due to severe disease.

In the embodiment illustrated in FIG. 2, the spinal canal topology refinement is applied to the initial set of spinal canal voxels detecting using the trained classifier, and seeds sampled from the topology refinement are used in the RW segmentation. It is to be understood that the present invention is not limited to this embodiment. In an alternative embodiment, the initial set of spinal canal voxels can be directly used as seed for a first RW segmentation and the spinal canal topology refinement then applied to the results of the first RW segmentation. In both embodiments, the topology refinement, seed sampling, and RW segmentation are iterated, resulting in a cascaded RW segmentation pipeline that provides a final spinal canal segmentation result.

Figure 9:
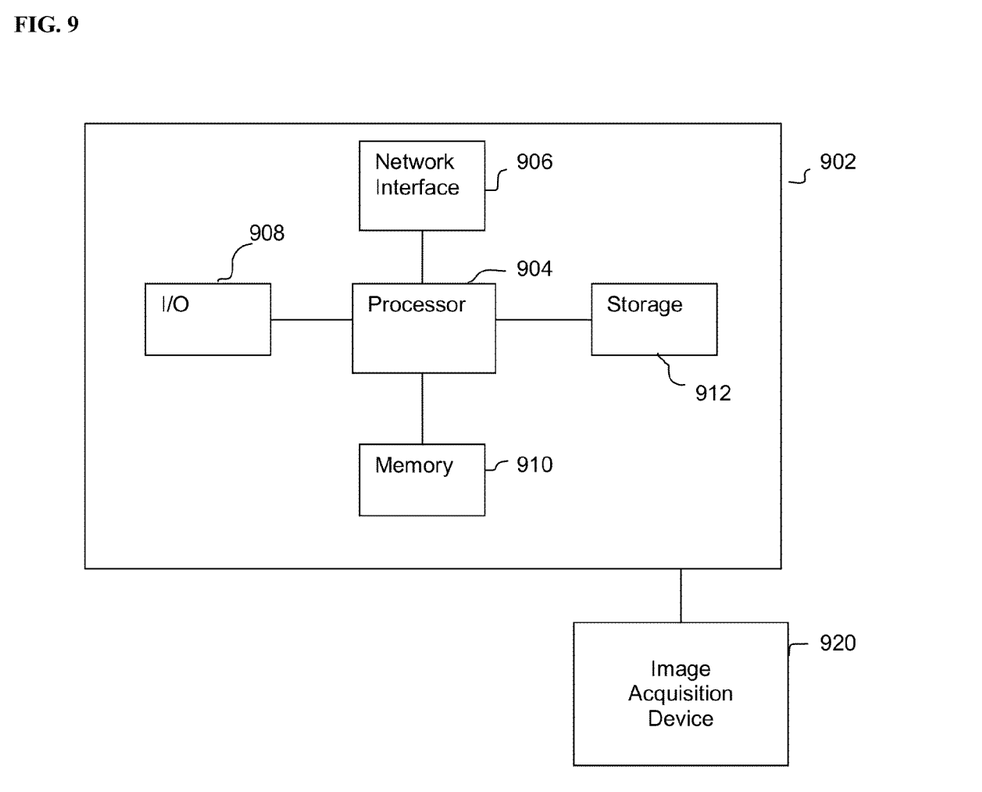
FIG. 9 is a high-level block diagram of a computer capable of implementing the present invention.

The above-described methods for automatic spinal canal segmentation may be implemented on a computer using well-known computer processors, memory units, storage devices, computer software, and other components. A high-level block diagram of such a computer is illustrated in FIG. 9. Computer 902 contains a processor 904, which controls the overall operation of the computer 902 by executing computer program instructions which define such operation. The computer program instructions may be stored in a storage device 912 (e.g., magnetic disk) and loaded into memory 910 when execution of the computer program instructions is desired. Thus, the steps of the methods of FIGS. 2 and 4 may be defined by the computer program instructions stored in the memory 910 and/or storage 912 and controlled by the processor 904 executing the computer program instructions. An image acquisition device 920, such as a CT scanning device, can be connected to the computer 902 to input image data to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.). Such input/output devices 908 may be used in conjunction with a set of computer programs as an annotation tool to annotate volumes received from the image acquisition device 920. One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for spinal canal segmentation in a 3D medical image, comprising:
   detecting an initial set of spinal canal voxels in the 3D medical image using a trained classifier;
   refining a spinal canal topology defined by a current set of spinal canal voxels based on an estimated medial line of the spinal canal;
   sampling seed points based on the refined spinal canal topology; and
   detecting an updated set of spinal canal voxels in the 3D medical image using random walks segmentation based on the sampled seed points.

2. The method of claim 1, further comprising:
repeating the refining the spinal canal topology defined by the current set of spinal canal voxels, the sampling seed points based on the refined spinal canal topology, and the detecting an updated set of spinal canal voxels until the spinal canal topology defined by the current set of spinal canal voxels converges.

3. The method of claim 1, further comprising:
repeating the refining the spinal canal topology defined by the current set of spinal canal voxels, the sampling seed points based on the refined spinal canal topology, and the detecting an updated set of spinal canal voxels until a length of the estimated medial line of the spinal cord converges.

4. The method of claim 1, further comprising:
repeating the refining the spinal canal topology defined by the current set of spinal canal voxels, the sampling seed points based on the refined spinal canal topology, and the detecting an updated set of spinal canal voxels until the updated set of spinal canal voxels converges.

5. The method of claim 1, wherein detecting an initial set of spinal canal voxels in the 3D medical image using a trained classifier comprises:
detecting voxels having a high probability of being within the spinal canal using the trained classifier.

6. The method of claim 1, wherein detecting an initial set of spinal canal voxels in the 3D medical image using a trained classifier comprises:
detecting the initial set of spinal canal voxels using a cascade of probabilistic boosting tree (PBT) classifiers based on 3D Haar features extracted as each of a plurality of voxels in the 3D medical image.

7. The method of claim 1, wherein refining a spinal canal topology defined by a current set of spinal canal voxels based on an estimated medial line of the spinal canal comprises:
calculating a plurality of medial points by calculating for each of a plurality of transverse slices of the 3D medical image, a medial point of the spinal canal voxels on that transverse slice;
connecting the medial points into medial segments;
generating virtual medial segments to fill gaps between the medial segments; and
generating virtual medial points along the virtual medial segments.

8. The method of claim 7, wherein connecting the medial points into medial segments comprises:
connecting medial points in neighboring slices into a medial segment; and
rejecting a medial point as an outlier if the curvature of a medial segment connecting the medial point to another medial segment is greater than a threshold.

9. The method of claim 7, wherein generating virtual medial segments to fill gaps between the medial segments comprises:
estimating a cubic Bezier curve in each gap between two medial segments.

10. The method of claim 7, wherein generating virtual medial points along the virtual medial segments comprises:
defining a univariate Gaussian intensity model based on a mean and standard deviation of intensities of the medial points; and
for each virtual medial segment, starting at opposite ends of the virtual medial segment sequentially admit voxels along the virtual medial segment as virtual medial points until a voxel is reached that is not within a single standard deviation range of the univariate Gaussian intensity model.

11. The method of claim 7, wherein sampling seed points based on the refined spinal canal topology comprises:
selecting the medial points and the virtual medial points as foreground seeds;
selecting, as foreground seeds, other voxels in the 3D medical image that have been classified as spinal canal voxels in a previous segmentation, have intensities within a single standard deviation range of a univariate Gaussian intensity model defined based on a mean and standard deviation of intensities of the medial points, and are connected to the estimated medial line via other foreground seeds; and
selecting voxels in the 3D medical image having intensities higher than a predetermined threshold as background seeds.

12. The method of claim 1, wherein the 3D medical image is a 3D CT volume.

13. An apparatus for spinal canal segmentation in a 3D medical image, comprising:
means for detecting an initial set of spinal canal voxels in the 3D medical image using a trained classifier;
means for refining a spinal canal topology defined by a current set of spinal canal voxels based on an estimated medial line of the spinal canal;
means for sampling seed points based on the refined spinal canal topology; and
means for iteratively detecting updated sets of spinal canal voxels in the 3D medical image using cascaded random walks segmentation based on the sampled seed points.

14. The apparatus of claim 13, wherein the means for refining a spinal canal topology defined by a current set of spinal canal voxels based on an estimated medial line of the spinal canal comprises:
means for calculating a medial point in each of a plurality of transverse slices of the 3D medical image;
means for connecting the medial points into medial segments;
means for generating virtual medial segments to fill gaps between the medial segments; and
means for generating virtual medial points along the virtual medial segments.

15. The apparatus of claim 14, wherein the means for connecting the medial points into medial segments comprises:
means for connecting medial points in neighboring slices into a medial segment; and
means for rejecting a medial point as an outlier if the curvature of a medial segment connecting the medial point to another medial segment is greater than a threshold.

16. The apparatus of claim 14, wherein the means for generating virtual medial segments to fill gaps between the medial segments comprises:
means for estimating a cubic Bezier curve in each gap between two medial segments.

17. The apparatus of claim 14, wherein the means for generating virtual medial points along the virtual medial segments comprises:
means for defining an appearance constrain based on intensities of the medial points; and
means for selecting voxels along each virtual medial segment as virtual medial points based on the appearance constraint.

18. A non-transitory computer readable medium storing computer program instructions for spinal canal segmentation in a 3D medical image, the computer program instructions when executed by a processor cause the processor to perform operations comprising:

nbsp;   detecting an initial set of spinal canal voxels in the 3D medical image using a trained classifier;

nbsp;   refining a spinal canal topology defined by a current set of spinal canal voxels based on an estimated medial line of the spinal canal;

nbsp;   sampling seed points based on the refined spinal canal topology; and nbsp;   detecting an updated set of spinal canal voxels in the 3D medical image using random walks segmentation based on the sampled seed points.

19. The non-transitory computer readable medium of claim 18, wherein the operations further comprise:

nbsp;   repeating the refining the spinal canal topology defined by the current set of spinal canal voxels, the sampling seed points based on the refined spinal canal topology, and the detecting an updated set of spinal canal voxels until the spinal canal topology defined by the current set of spinal canal voxels converges.

20. The non-transitory computer readable medium of claim 18, wherein the operations further comprise:

nbsp;   repeating the refining the spinal canal topology defined by the current set of spinal canal voxels, the sampling seed points based on the refined spinal canal topology, and the detecting an updated set of spinal canal voxels until a length of the estimated medial line of the spinal cord converges.

21. The non-transitory computer readable medium of claim 18, wherein the operations further comprise:

nbsp;   repeating the refining the spinal canal topology defined by the current set of spinal canal voxels, the sampling seed points based on the refined spinal canal topology, and the detecting an updated set of spinal canal voxels until the updated set of spinal canal voxels converges.

22. The non-transitory computer readable medium of claim 18, wherein detecting an initial set of spinal canal voxels in the 3D medical image using a trained classifier comprises:

nbsp;   detecting the initial set of spinal canal voxels using a cascade of probabilistic boosting tree (PBT) classifiers based on 3D Haar features extracted as each of a plurality of voxels in the 3D medical image.

23. The non-transitory computer readable medium of claim 18, wherein refining a spinal canal topology defined by a current set of spinal canal voxels based on an estimated medial line of the spinal canal comprises:

nbsp;   calculating a plurality of medial points by calculating for each of a plurality of transverse slices of the 3D medical image, a medial point of the spinal canal voxels on that transverse slice;

nbsp;   connecting the medial points into medial segments;

nbsp;   generating virtual medial segments to fill gaps between the medial segments; and nbsp;   generating virtual medial points along the virtual medial segments.

24. The non-transitory computer readable medium of claim 23, wherein connecting the medial points into medial segments comprises:

nbsp;   connecting medial points in neighboring slices into a medial segment; and nbsp;   rejecting a medial point as an outlier if the curvature of a medial segment connecting the medial point to another medial segment is greater than a threshold.

25. The non-transitory computer readable medium of claim 23, wherein generating virtual medial segments to fill gaps between the medial segments comprises:

nbsp;   estimating a cubic Bezier curve in each gap between two medial segments.

26. The non-transitory computer readable medium of claim 23, wherein generating virtual medial points along the virtual medial segments comprises:

nbsp;   defining a univariate Gaussian intensity model based on a mean and standard deviation of intensities of the medial points; and nbsp;   for each virtual medial segment, starting at opposite ends of the virtual medial segment sequentially admit voxels along the virtual medial segment as virtual medial points until a voxel is reached that is not within a single standard deviation range of the univariate Gaussian intensity model.

27. The non-transitory computer readable medium of claim 23, wherein sampling seed points based on the refined spinal canal topology comprises:

nbsp;   selecting the medial points and the virtual medial points as foreground seeds;

nbsp;   selecting, as foreground seeds, other voxels in the 3D medical image that have been classified as spinal canal voxels in a previous segmentation, have intensities within a single standard deviation range of a univariate Gaussian intensity model defined based on a mean and standard deviation of intensities of the medial points, and are connected to the estimated medial line via other foreground seeds; and nbsp;   selecting voxels in the 3D medical image having intensities higher than a predetermined threshold as background seeds.

* * * * *